US012019087B2

(12) United States Patent
Utsugi et al.

(10) Patent No.: US 12,019,087 B2
(45) Date of Patent: Jun. 25, 2024

(54) SPECIMEN TREATMENT SYSTEM

(71) Applicant: Hitachi High-Tech Corporation, Tokyo (JP)

(72) Inventors: Yasushi Utsugi, Tokyo (JP); Kuniaki Onizawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 422 days.

(21) Appl. No.: 17/278,053

(22) PCT Filed: Feb. 5, 2020

(86) PCT No.: PCT/JP2020/004288
§ 371 (c)(1),
(2) Date: Mar. 19, 2021

(87) PCT Pub. No.: WO2020/162484
PCT Pub. Date: Aug. 13, 2020

(65) Prior Publication Data
US 2021/0356484 A1  Nov. 18, 2021

(30) Foreign Application Priority Data

Feb. 5, 2019  (JP) .................................. 2019-018390

(51) Int. Cl.
*G01N 35/04* (2006.01)
*G01N 35/00* (2006.01)

(52) U.S. Cl.
CPC ....... *G01N 35/04* (2013.01); *G01N 35/00594* (2013.01); *G01N 2035/0403* (2013.01); *G01N 2035/0493* (2013.01)

(58) Field of Classification Search
None
See application file for complete search history.

(56) References Cited

U.S. PATENT DOCUMENTS

| 2013/0017595 A1 | 1/2013 | Yamamoto et al. |
| 2013/0125648 A1 | 5/2013 | Murashie et al. |
| (Continued) | | |

FOREIGN PATENT DOCUMENTS

| DE | 19911351 A1 | 9/2000 |
| JP | 856107132 A | 8/1981 |
| (Continued) | | |

OTHER PUBLICATIONS

Machine generated English translation of JP200785967 (Year: 2007).*

(Continued)

*Primary Examiner* — P. Kathryn Wright
(74) *Attorney, Agent, or Firm* — Miles & Stockbridge, P.C.

(57) ABSTRACT

Provided is a specimen treatment system that can detect whether a specimen container is uncapped by using a simple mechanism. The specimen treatment system comprises: an automatic analyzer that analyzes a specimen; a pretreatment device that performs a pretreatment on the specimen; and a conveyance passage that conveys, in the automatic analyzer or in the pretreatment device, a specimen container that houses the specimen. The specimen treatment system is characterized by further comprising a single sensor that is disposed so as to be orthogonal to the longitudinal direction of the specimen container and that detects whether the specimen container is uncapped.

1 Claim, 8 Drawing Sheets

(56) References Cited

U.S. PATENT DOCUMENTS

| | | | | |
|---|---|---|---|---|
| 2014/0224382 A1* | 8/2014 | Nuotio | ............... | B67B 7/00 141/98 |
| 2014/0314623 A1 | 10/2014 | Yamagata et al. | | |
| 2018/0059006 A1 | 3/2018 | Fritchie et al. | | |

FOREIGN PATENT DOCUMENTS

| | | | | |
|---|---|---|---|---|
| JP | H06008995 | A | | 1/1994 |
| JP | H0726743 | U | | 5/1995 |
| JP | 3025114 | B2 | | 3/2000 |
| JP | 2003098179 | A | | 4/2003 |
| JP | 2007078363 | A | | 3/2007 |
| JP | 200785967 | | * | 4/2007 |
| JP | 2007085967 | A | | 4/2007 |
| JP | 2016050784 | A | | 4/2016 |
| JP | 2017026381 | A | * | 2/2017 |
| JP | 2018165689 | A | | 10/2018 |
| WO | 2011080894 | A1 | | 7/2011 |
| WO | 2013002213 | A1 | | 1/2013 |
| WO | 2015056649 | A1 | | 4/2015 |

OTHER PUBLICATIONS

Machine generated English translation of JP 2017026381 (year:2017).*
Search Report dated May 25, 2022 in European Application No. 20752816.7.
Search Report dated Apr. 21, 2020 in corresponding International Application No. PCT/JP2020/004288.
Written Opinion dated Apr. 21, 2020 in corresponding International Application No. PCT/JP2020/004288.

* cited by examiner

[FIG. 1]
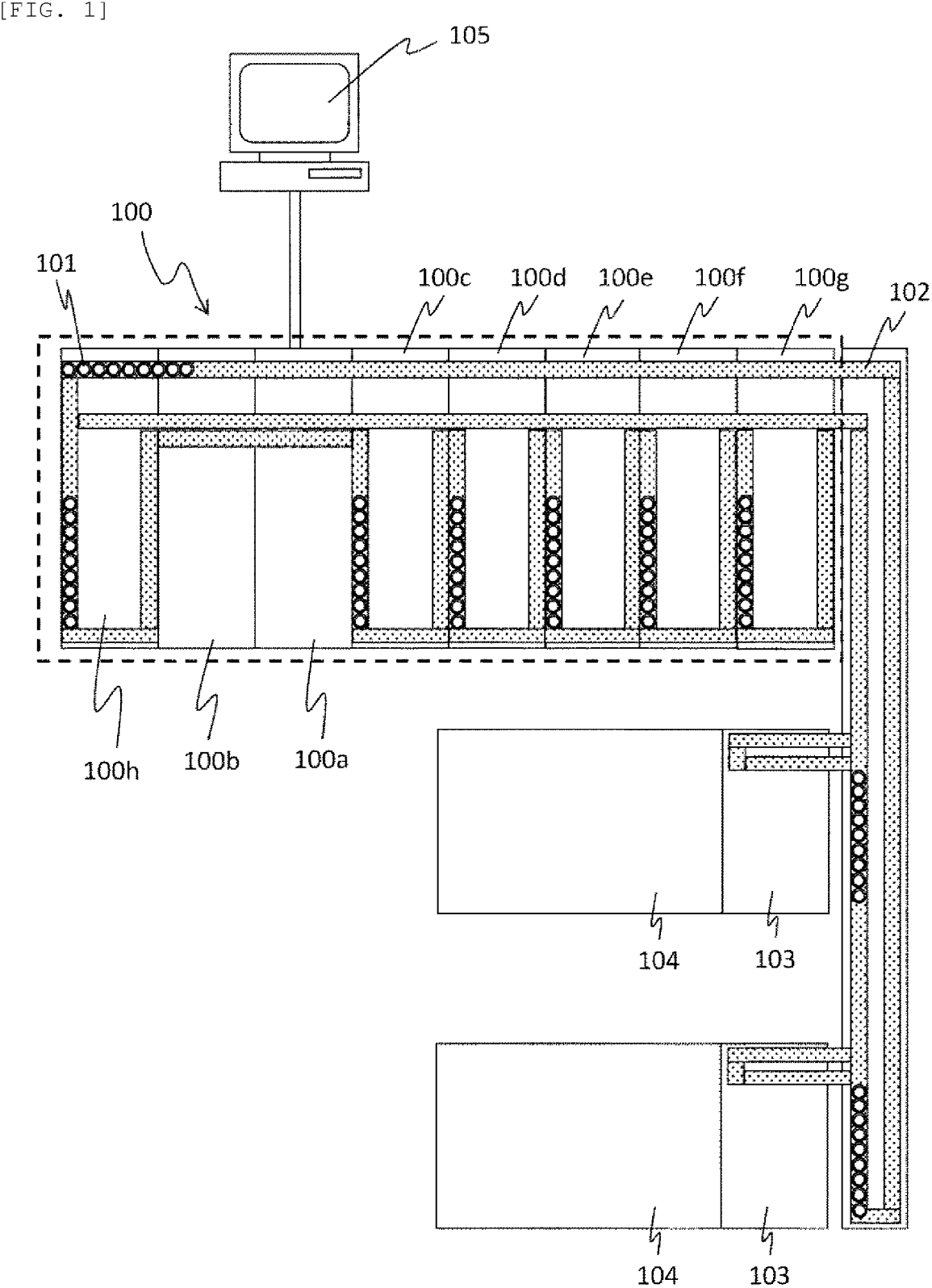

[FIG. 4]
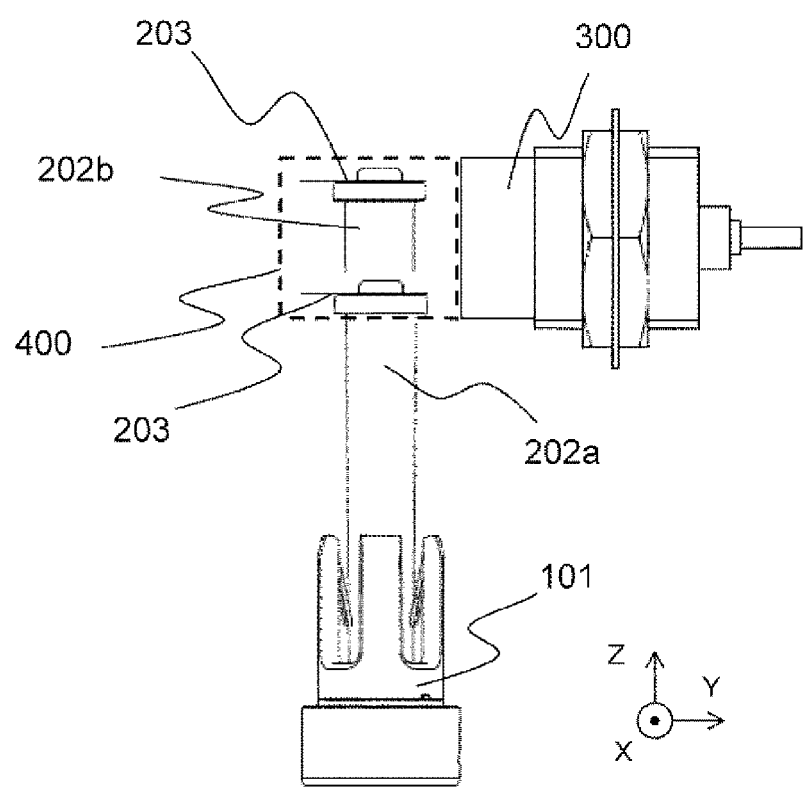

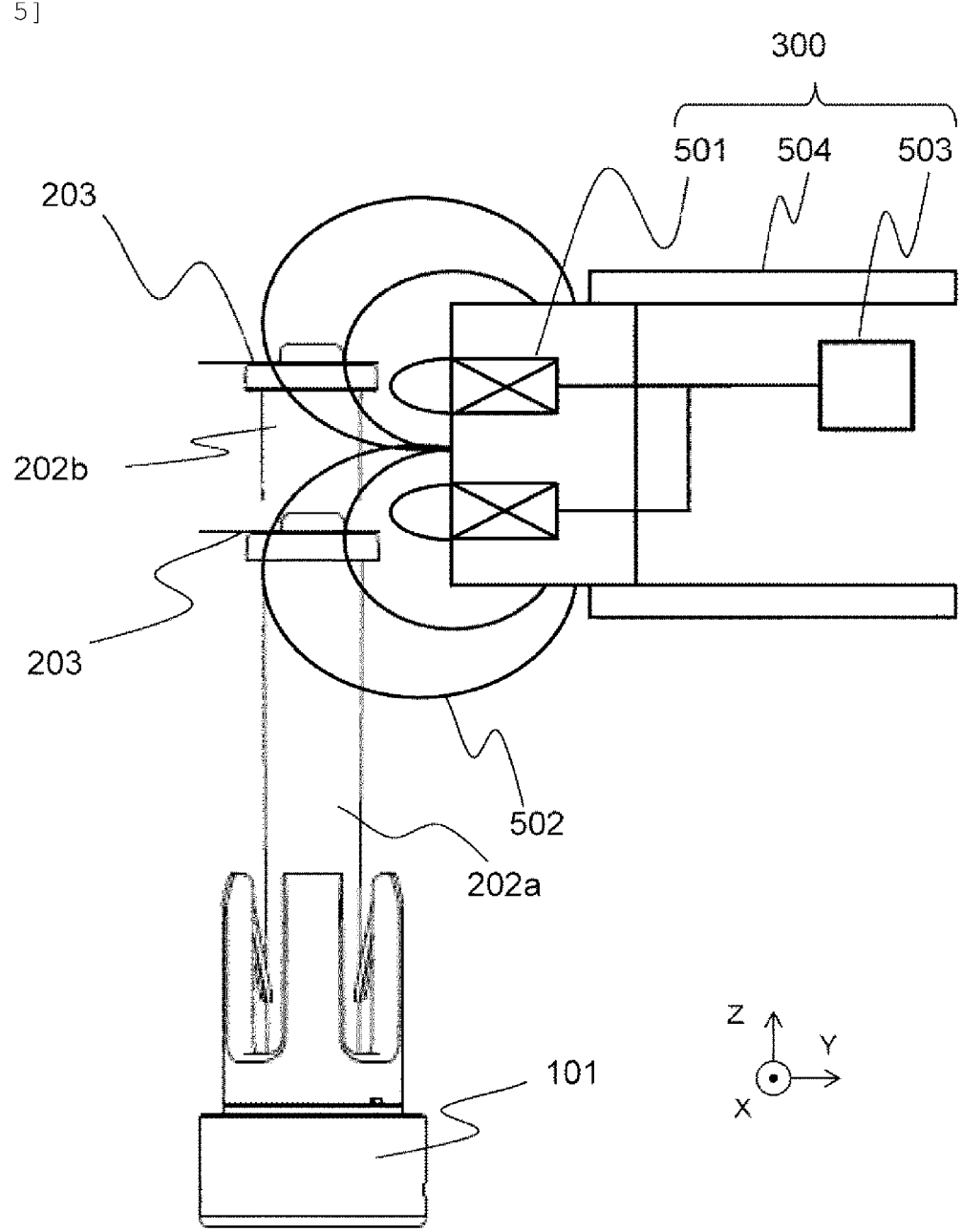
[FIG. 5]

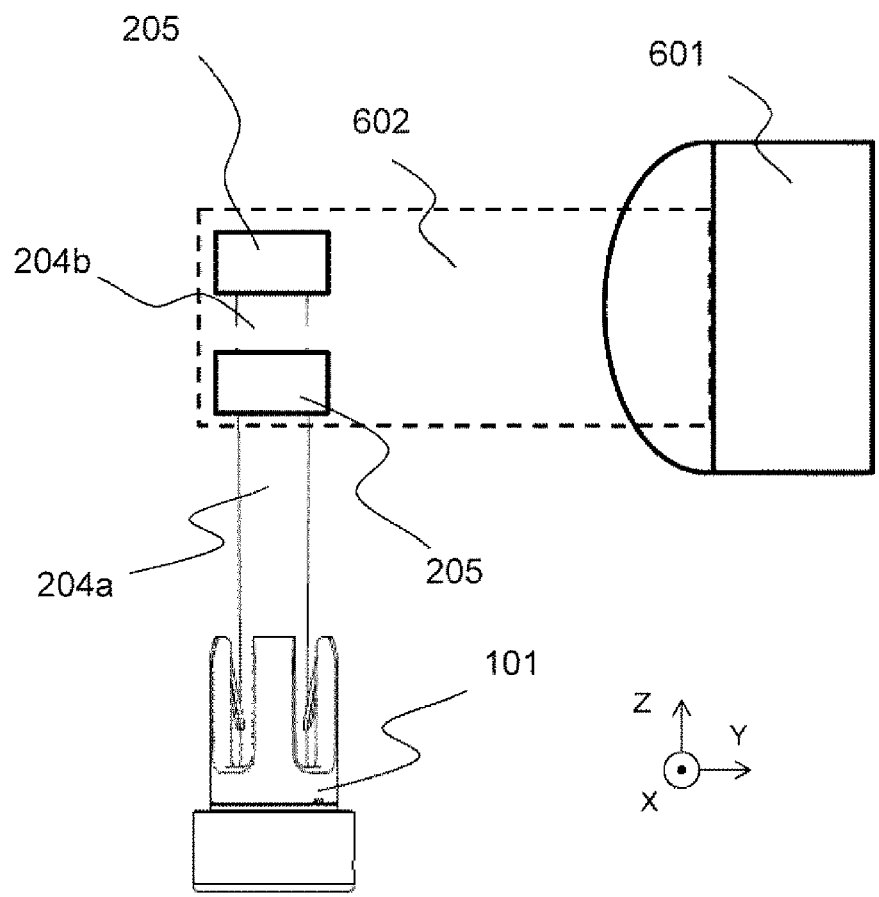

[FIG. 7]
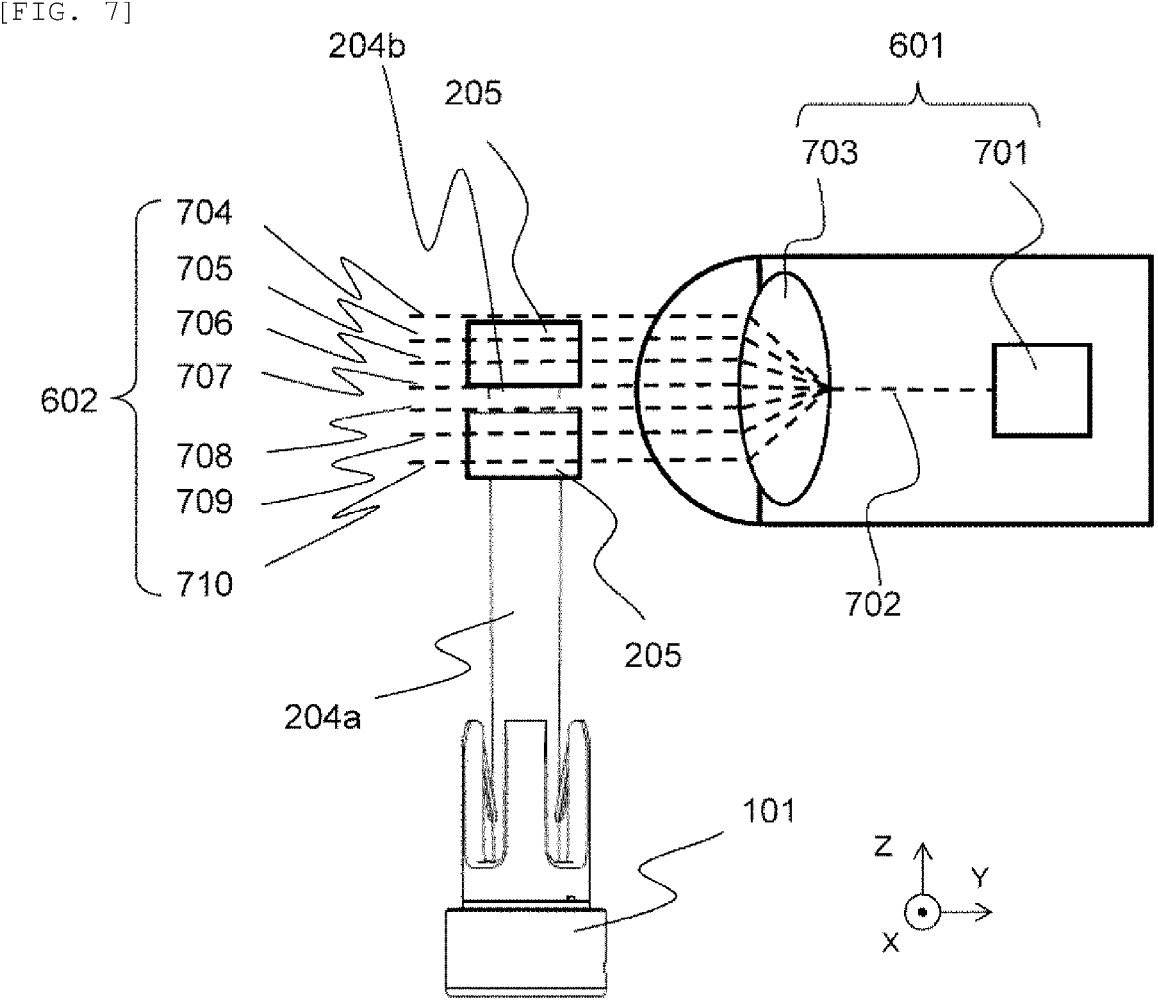

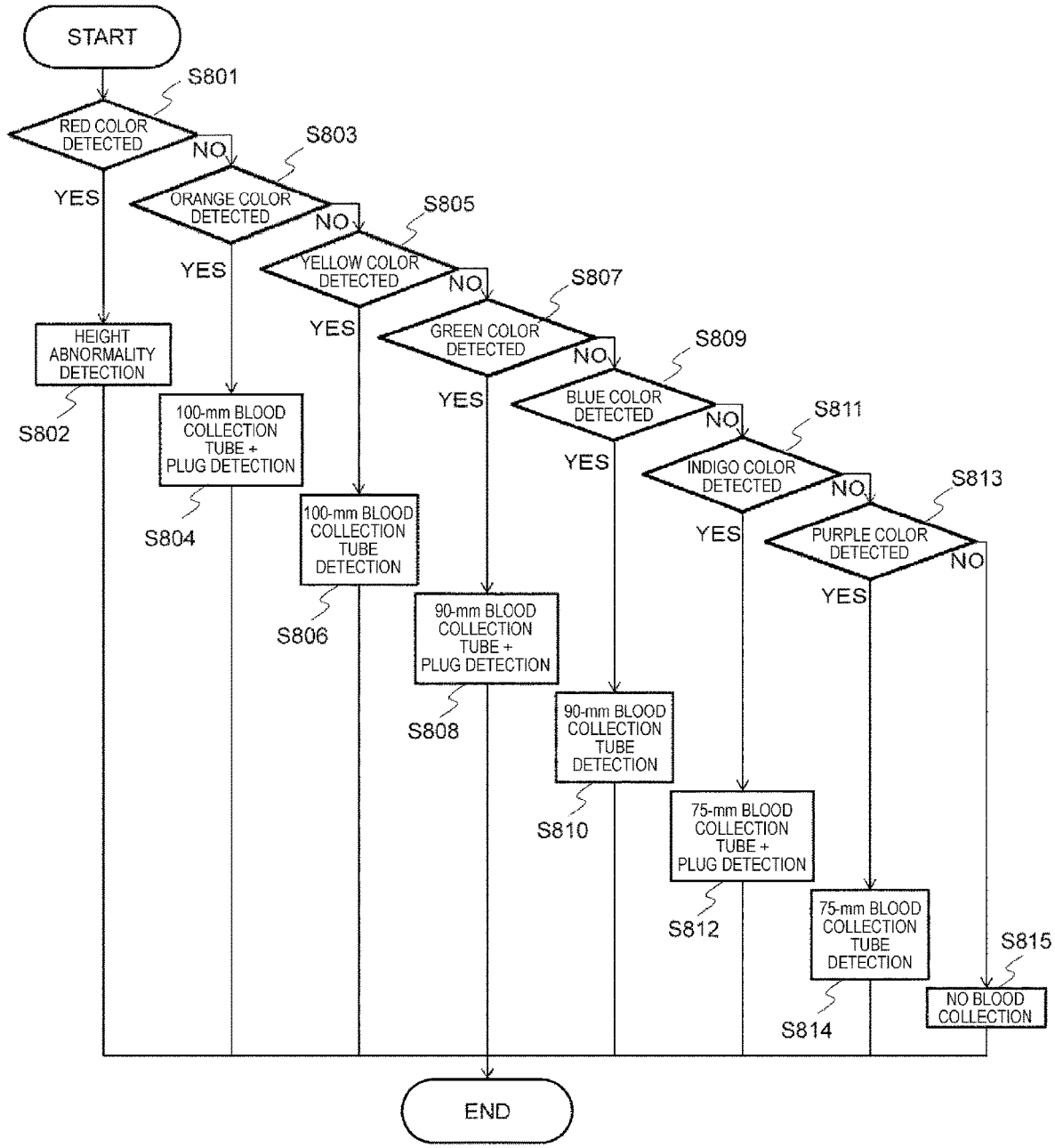

SPECIMEN TREATMENT SYSTEM

TECHNICAL FIELD

The present invention relates to a specimen treatment system including an automatic analyzer that analyzes a specimen such as blood or urine and a pretreatment device that performs various pretreatments on a specimen prior to the analysis, and particularly to a technique for detecting whether a specimen container that houses a specimen is uncapped.

BACKGROUND ART

The automatic analyzer is used in hospitals and laboratories to analyze specimen such as blood and urine provided by patients and are indispensable for patient diagnosis. The specimen container that houses the specimen is capped with a rubber plug or the like in order to prevent contamination or leakage until various pretreatments and analyses are performed, and thus is required to be uncapped prior to the pretreatment or analysis.

U.S. Pat. No. 3,025,114 (PTL 1) discloses an uncapping device that automatically performs an uncapping operation, even if liquid collection tubes with different heights are mixed. Specifically, disclosed is an uncapping device that positions the height of uncapping means for uncapping a liquid collection tube according to the height determined by height determination means with a plurality of photo sensors in order to determine the height of the liquid collection tube.

CITATION LIST

Patent Literature

PTL 1: U.S. Pat. No. 3,025,114

SUMMARY OF INVENTION

Technical Problem

However, in PTL 1, it is required to include a plurality of photo sensors for determining the height of the liquid collection tube which is an example of the specimen container, and thus the specimen treatment system becomes complicated. In PTL 1, beams are emitted from each photo sensor in the horizontal direction, and thus it is difficult to detect whether a seal plug with the extremely thinner thickness than the rubber plug is uncapped. In a dispensing unit included in the automatic analyzer or the pretreatment device included in the specimen treatment system, if the specimen container is conveyed without being uncapped, a nozzle for analysis or dispensing collides with a plug of the specimen container to damage the specimen treatment system or knocks down the specimen container to lose the specimen.

An object of the present invention is to provide a specimen treatment system that can detect whether the specimen container is uncapped by using a simple mechanism.

Solution to Problem

In order to achieve the object, the present invention provides a specimen treatment system including: an automatic analyzer that analyzes a specimen; a pretreatment device that performs a pretreatment on the specimen; and a conveyance passage that conveys, in the automatic analyzer or in the pretreatment device, a specimen container that houses the specimen, the specimen treatment system further including a single sensor that is disposed to be orthogonal to the longitudinal direction of the specimen container and that detects whether the specimen container is uncapped.

Advantageous Effects of Invention

According to the present invention, it is possible to provide a specimen treatment system that can detect whether the specimen container is uncapped by using a simple mechanism.

BRIEF DESCRIPTION OF DRAWINGS

FIG. 1 is a diagram illustrating an example of the entire configuration of a specimen treatment system.

FIG. 4 is a diagram illustrating an example of a seal plug sensor of Embodiment 1.

FIG. 5 is a diagram illustrating details of the seal plug sensor of Embodiment 1.

FIG. 6 is a diagram illustrating an example of a rubber plug sensor of Embodiment 2.

FIG. 7 is a diagram illustrating details of the rubber plug sensor of Embodiment 2.

FIG. 8 is a diagram illustrating an example of a flow of a treatment of Embodiment 2.

DESCRIPTION OF EMBODIMENTS

Figure 2A:
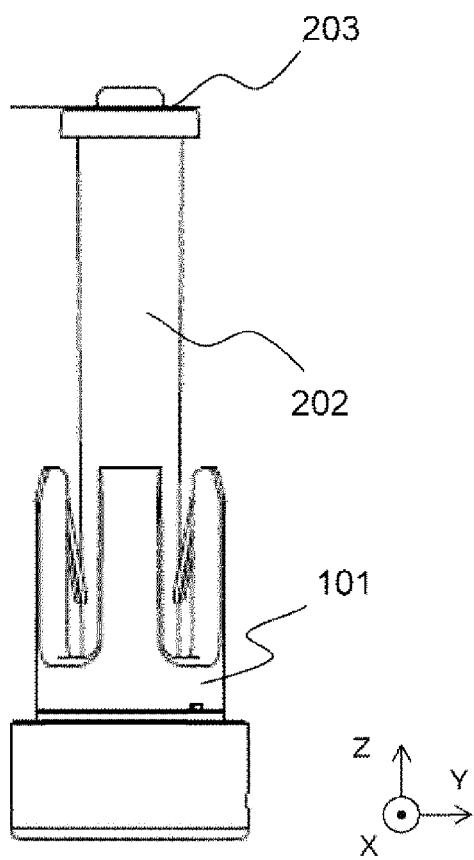
FIGS. 2A and 2B are diagrams illustrating an example of a capped specimen container.

Hereinafter, a preferred embodiment of a specimen treatment system according to the present invention is described with reference to accompanying drawings. In the following description and the accompanying drawings, components having the same functional configuration are denoted by the same reference numerals, and duplicate descriptions are omitted.

Embodiment 1

An example of a configuration of the specimen treatment system is described with reference to FIG. 1. The specimen treatment system is a system that analyzes a specimen such as blood or urine provided by a patient and performs various pretreatments on the specimen prior to the analysis, and includes a pretreatment device 100, a conveyance passage 102, an automatic analyzer 104, and a control unit 105. Hereinafter, each part is described.

The pretreatment device 100 is configured by connecting a plurality of units with various functions. For example, a charging unit 100a, a storage unit 100b, a centrifuge unit 100c, a liquid amount measuring unit 100d, an uncapping unit 100e, a child blood collection tube generating unit 100f, a dispensing unit 100g, and a capping unit 100h are connected to each other to configure the pretreatment device 100. Hereinafter, each unit is described.

The charging unit 100a is a unit for charging a specimen container that houses a specimen to the specimen treatment system. The charged specimen container is mounted on a holder 101 and conveyed into the specimen treatment system by the conveyance passage 102. In the charging unit 100a, a barcode or the like attached to the specimen container is read by a specimen recognition unit (not illustrated), ID information for specifying a specimen is obtained, and the specimen is specified. The specimen recognition unit is not limited to the charging unit 100*a* and may be provided at each location in the specimen treatment system.

An example of the specimen container is described with reference to FIGS. 2A and 2B. FIG. 2A illustrates a side surface diagram of a blood collection tube for seal plug 202 which is a specimen container capped with a seal plug 203 and mounted on the holder 101. The blood collection tube for seal plug 202 is one of the specimen container that houses blood collected from a patient. According to the amount of the collected blood, the blood collection tubes for seal plug 202 with different heights are properly used, and the blood collection tubes for seal plug 202, for example, with heights of 75 mm, 90 mm, and 100 mm are used. The seal plug 203 is a film seal made of metal and having the thickness of about 0.05 mm. The seal plug 203 is attached to the upper end part of the blood collection tube for seal plug 202 to cap the blood collection tube for seal plug 202. A margin for easily attaching the seal plug 203 may be provided in the upper end part of the blood collection tube for seal plug 202. The holder 101 is made of plastic resin, provided with the blood collection tube for seal plug 202 that is the specimen container, and conveyed into the specimen treatment system by the conveyance passage 102.

Figure 2B:
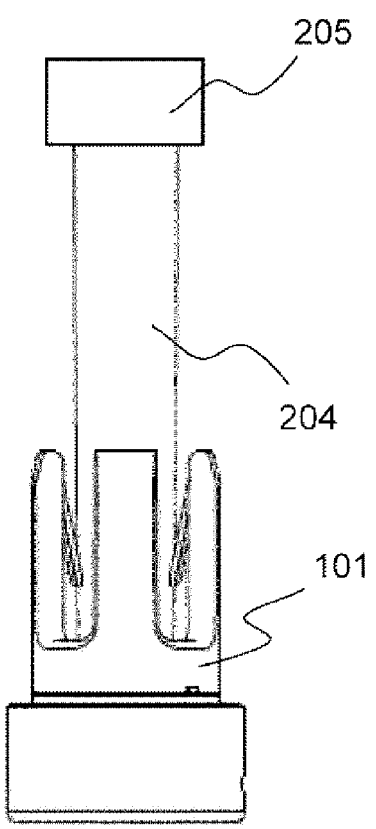

FIG. 2B illustrates a blood collection tube for rubber plug 204 that is a specimen container capped with a rubber plug 205 and mounted on the holder 101. The blood collection tube for rubber plug 204 is one of the specimen container that houses blood and has, for example, heights of 75 mm, 90 mm, and 100 mm in the same manner as in the blood collection tube for seal plug 202. The rubber plug 205 is a plug made of rubber and caps the blood collection tube for rubber plug 204 by being installed at the upper end part of the blood collection tube for rubber plug 204.

The description refers back to FIG. 1. If the specimen is blood, the centrifuge unit 100*c* is a unit that performs centrifugation on the charged specimen container and separates the blood into each component.

The liquid amount measuring unit 100*d* is a unit that measures or determines the amount or the color of the specimen in the specimen container. A laser light source unit and an image recognition unit (not illustrated) are used for measurement and determination with the liquid amount measuring unit 100*d*.

The uncapping unit 100*e* is a unit for uncapping the capped specimen container. A plurality of kinds of plugs that cap the specimen container are present, and thus the uncapping unit 100*e* may be provided depending on the kind of the plug.

The child blood collection tube generating unit 100*f* is a unit that prepares the child blood collection tube. The child blood collection tube is another specimen container used for subdividing blood that is the specimen that is housed by the specimen container, and a barcode or the like may be attached to the child blood collection tube, in order to specify the subdivided specimen. The prepared child blood collection tube is mounted on the holder 101.

The dispensing unit 100*g* is a unit for dispensing a specimen from the specimen container. For example, components of blood separated by the centrifuge unit 100*c* are dispensed by the dispensing unit 100*g* to the child blood collection tube prepared by the child blood collection tube generating unit 100*f* and are analyzed by the automatic analyzer 104 described below. When the specimen is dispensed, a nozzle for sucking the specimen is inserted into the specimen container.

The capping unit 100*h* is a unit that caps an uncapped specimen container or a child blood collection tube to which components of blood are dispensed. The capping unit 100*h* may be provided depending on the kind of the plug that caps the specimen container.

The storage unit 100*b* is a unit that stores the specimen container capped by the capping unit 100*h*.

The present configuration is merely an example, and the pretreatment device 100 may not include all the above units and may include units with other functions. The units are connected by the conveyance passage 102 that conveys the holder 101 on which the specimen container is mounted.

The conveyance passage 102 conveys the holder 101 on which the specimen container that houses the specimen is mounted to the pretreatment device 100, the automatic analyzer 104, or a portion between the pretreatment device 100 and the automatic analyzer 104. In the pretreatment device 100, the conveyance passage 102 may omit several units and convey the holder 101. For example, if the specimen is urine, the centrifuge unit 100*c* may be omitted.

The automatic analyzer 104 is a device that qualitatively and quantitatively analyzes components of a specimen subjected to a pretreatment. The automatic analyzer 104 is a device for biochemical analysis, immunological analysis, and coagulation analysis, and includes the plurality of automatic analyzers 104 according to applications of the specimen treatment system. Between the automatic analyzer 104 and the conveyance passage 102, a connecting unit 103 that connects the both to each other is provided. The connecting unit 103 conveys the uncapped specimen container to a position of a specimen sucking nozzle of the automatic analyzer 104.

The control unit 105 controls an operation of the pretreatment device 100, the conveyance passage 102, and the like included in the specimen treatment system and analyzes or stores measurement data obtained by analysis with the automatic analyzer 104. The control unit 105 may be configured with a so-called computer and can be operated by a predetermined program.

If a specimen container is conveyed without being uncapped, to the dispensing unit 100*g* or the automatic analyzer 104 of the specimen treatment system with the configuration described above, there may be inconvenience. That is, the specimen sucking nozzle of the dispensing unit 100*g* or the automatic analyzer 104 may collide with a plug of the specimen container to damage the specimen treatment system or knock down the specimen container to lose the specimen. Here, in the present embodiment, the specimen treatment system includes a single sensor that detects whether the specimen container is uncapped.

Figure 3A:
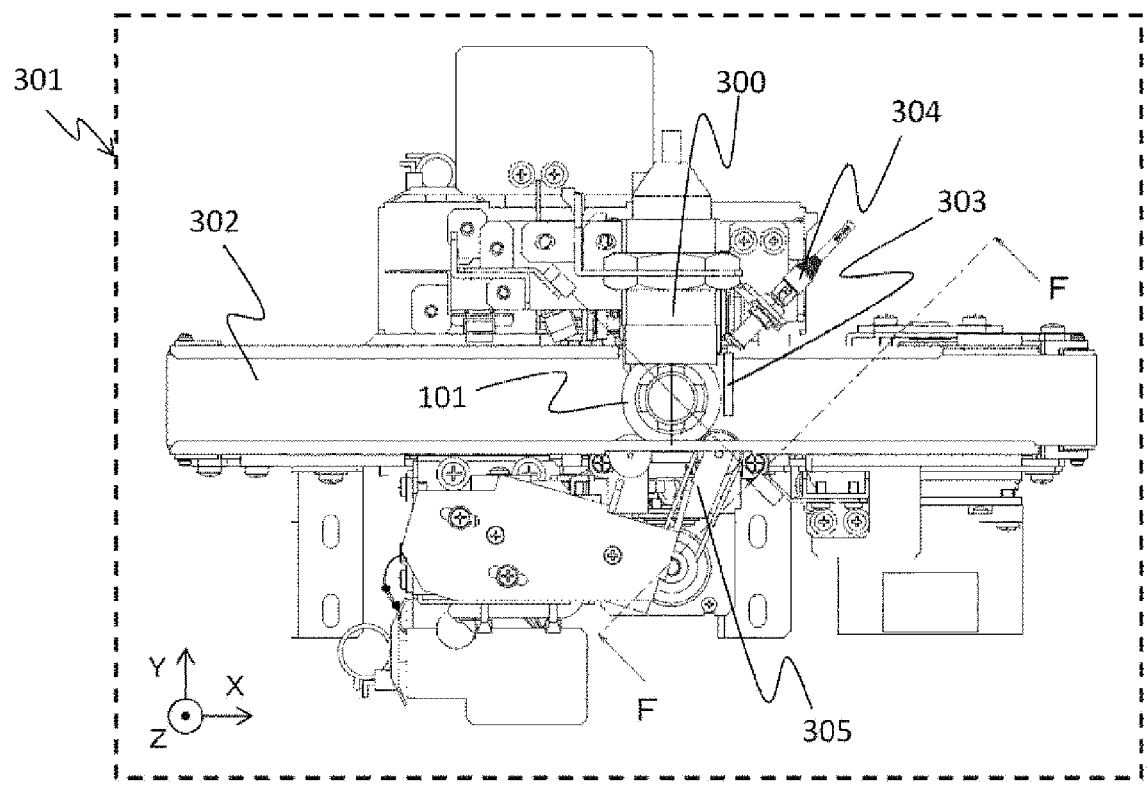
FIGS. 3A and 3B are diagrams illustrating an example of a plug detection unit of Embodiment 1.
Figure 3B:
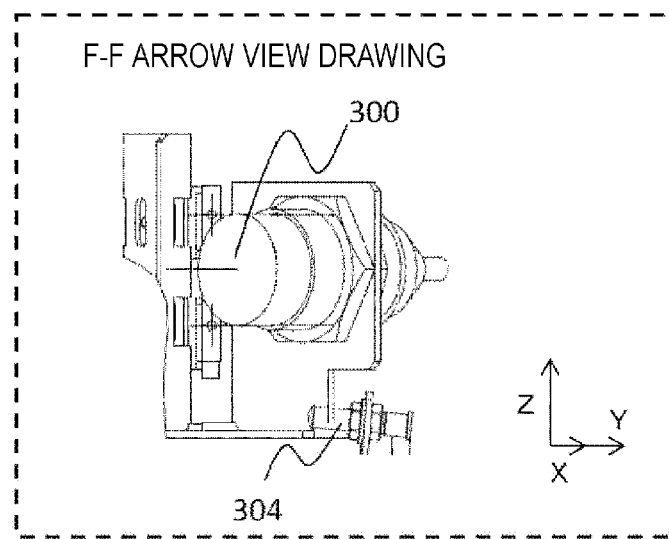

A plug detection unit 301 of the present embodiment is described with reference to FIGS. 3A and 3B. FIG. 3A is a top view of the plug detection unit 301, and FIG. 3B is a view taken along the line F-F of FIG. 3A. The plug detection unit 301 is disposed on the path of the conveyance passage 102, for example, between the uncapping unit 100*e* and the dispensing unit 100*g* or on the connecting unit 103, and includes a seal plug sensor 300, a belt 302, a stopper 303, a holder detection unit 304, and a holder rotating part 305. Hereinafter, each part is described.

The seal plug sensor 300 is a sensor that detects whether the specimen container conveyed by the conveyance passage 102 is uncapped, and is disposed to be orthogonal to a Z direction that is a longitudinal direction of the specimen container. Details of the seal plug sensor 300 are described below with reference to FIGS. 4 and 5.

The belt 302 is a portion of the conveyance passage 102 and continuously moves in a X direction of FIG. 3A to convey the holder 101.

The stopper 303 is a bar for stopping the holder 101 conveyed by the belt 302 at a position where the seal plug sensor 300 is disposed. The stopper 303 is lowered to stop the holder 101 during the operation of the seal plug sensor 300 and is raised when uncapping is detected.

The holder detection unit 304 is a detector that detects the holder 101 conveyed by the belt 302. The stopper 303 is operated when the holder detection unit 304 detects the holder 101, and stops the holder 101 at the position of the seal plug sensor 300.

The holder rotating part 305 is a device that rotates the holder 101 stopped by the stopper 303 about a Z axis. The holder rotating part 305 rotates the holder 101 so that a barcode reader (not illustrated) reads a barcode attached to a specimen container.

The seal plug sensor 300 is described with reference to FIG. 4. The seal plug sensor 300 is a sensor that detects whether the blood collection tube for seal plug 202 is uncapped and is disposed to be orthogonal to the Z direction that is the longitudinal direction of the blood collection tube for seal plug 202. That is, the seal plug sensor 300 is disposed to be parallel to the surface of the seal plug 203 that caps the blood collection tube for seal plug 202. The detection range 400 that is a range in which the seal plug sensor 300 can detect the seal plug 203 is set in the range of the upper end part of the blood collection tube for seal plug 202 with the different height. For example, if the blood collection tubes for seal plug 202 with the heights of 75 mm, 90 mm, and 100 mm are used, a detection range 400 is set to include upper end parts of a 75-mm blood collection tube for seal plug 202a with the height of 75 mm and a 100-mm blood collection tube for seal plug 202b with the height of 100 mm. In FIG. 4, the detection range 400 set to include the upper end part of the 75-mm blood collection tube for seal plug 202a and the upper end part of the 100-mm blood collection tube for seal plug 202b, is shown with a dotted line.

Details of the seal plug sensor 300 are described with reference to FIG. 5. The seal plug sensor 300 includes a detection coil 501, a detection circuit 503, and a shield 504. The detection coil 501 is a coil wrapped around an axis parallel to the Y axis, and emits a high frequency magnetic field 502 by the flow of a high frequency current. The detection circuit 503 is a circuit that supplies the high frequency current to the detection coil 501 and detects a state of the high frequency magnetic field 502 emitted from the detection coil 501. The shield 504 is a metal housing that covers at least a portion of an outer peripheral surface of the detection coil 501 for shielding the detection circuit 503 or the like from the high frequency magnetic field 502 or the like.

If metal comes close to the high frequency magnetic field 502 emitted from the detection coil 501, an induced current flows through the metal to lose heat, and thus the state of the high frequency magnetic field 502 changes. The detection circuit 503 detects a state of the high frequency magnetic field 502 by the impedance measurement of the detection coil 501, to detect whether the metal seal plug 203 is present in the detection range 400, that is, whether the specimen container is capped, from the state change of the high frequency magnetic field 502. The detection result by the detection circuit 503 is sent to the control unit 105.

The detection range 400 that is a range where the high frequency magnetic field 502 is emitted is set in a range of different heights of the specimen container, and thus whether, for example, the blood collection tubes for seal plug 202 with the heights of 75 mm, 90 mm, and 100 mm are capped can be detected. The detection range 400 may be adjusted by changing the relative position between the detection coil 501 and the shield 504 in the Y direction.

As described above, according to the present embodiment, whether the blood collection tube for seal plug 202 which is one of the specimen container is uncapped can be detected by the single seal plug sensor 300. That is, it is possible to provide the specimen treatment system that can detect whether the specimen container is uncapped with a simple mechanism.

Embodiment 2

In Embodiment 1, detection of whether the specimen container is capped with the seal plug 203 by the seal plug sensor 300 that emits a high frequency magnetic field is described. As illustrated in FIGS. 2A and 2B, the present invention is not limited to the seal plug 203, but the specimen container may be capped by the rubber plug 205. According to the present embodiment, detection of whether the specimen container is capped with the non-metal rubber plug 205 is described. The same configuration as that in Embodiment 1 is denoted by the same reference numeral, and the description thereof is omitted.

The rubber plug sensor 601 is described with reference to FIG. 6. According to the present embodiment, the seal plug sensor 300 of FIGS. 3A and 3B is substituted with a rubber plug sensor 601. The rubber plug sensor 601 is a sensor that detects whether the blood collection tube for rubber plug 204 is uncapped and is disposed to be orthogonal to the Z direction that is the longitudinal direction of the blood collection tube for rubber plug 204. That is, the rubber plug sensor 601 is disposed to be parallel to the bottom surface of the rubber plug 205 that caps the blood collection tube for rubber plug 204. The emission range of a dispersed light 602 emitted from the rubber plug sensor 601 is set to the range of the rubber plug 205 that caps the blood collection tube for rubber plug 204 with the different height. For example, if the blood collection tubes for rubber plug 204 with the heights of 75 mm to 100 mm are used, the emission range of the dispersed light 602 is set to include the rubber plugs 205 that cap a 75-mm blood collection tube for rubber plug 204a with the height of 75 mm and a 100-mm blood collection tube for rubber plug 204b with the height of 100 mm.

Details of the rubber plug sensor 601 are described with reference to FIG. 7. The rubber plug sensor 601 includes a light emitting and receiving part 701 and a prism 703. The light emitting and receiving part 701 is an element for generating white light 702 and detecting light. The prism 703 is a transparent body that disperses the white light 702 to generate the dispersed light 602. The dispersed light 602 generated by the prism 703 includes light with various wavelength, that is, monochromatic light of a red color 704, an orange color 705, a yellow color 706, a green color 707, a blue color 708, an indigo color 709, and a purple color 710 in an order from the light with the longest wavelength.

The reflected light generated by reflection of the dispersed light 602 by the blood collection tube for rubber plug 204 or the rubber plug 205 is detected by the light emitting and receiving part 701. Since the monochromatic light included in the dispersed light 602 has the different emitted height, the height of the blood collection tube for rubber plug 204 can be determined based on the color of the reflected light detected by the light emitting and receiving part 701, and whether the blood collection tube for rubber plug 204 is capped can be detected. The height of the emission of the light of each color is adjusted by appropriately changing the shape or the material of the prism 703.

In FIG. 7, the red color 704 is emitted to a portion higher than the rubber plug 205 that caps the 100-mm blood collection tube for rubber plug 204b, the shorter the wavelength of light, the lower position, and the purple color 710 is emitted to the upper end part of the uncapped 75-mm blood collection tube for rubber plug 204a. In order to detect the blood collection tube for rubber plug 204 capped by the rubber plug 205, the orange color 705, the green color 707, and the indigo color 709 are used and correspond to the blood collection tubes for rubber plug 204 with the heights of 100 mm, 90 mm, and 75 mm, respectively. A light reflecting material may be provided on the side surface of the rubber plug 205, so that the reflected light may be easily detected.

A flow of a treatment of the present embodiment, that is, a flow of a treatment of determining the height of the blood collection tube for rubber plug 204 and detecting capping is described with reference to FIG. 8.

(S801)
The control unit 105 determines whether the red color 704 is included in the detected reflected light. If the red color 704 is included, the treatment proceeds to S802, and otherwise, the treatment proceeds to S803.

(S802)
The control unit 105 determines that the height of the specimen container is abnormal, and ends the flow of the treatment.

(S803)
The control unit 105 determines whether the orange color 705 is included in the detected reflected light. If the orange color 705 is included, the treatment proceeds to S804, and otherwise, the treatment proceeds to S805.

(S804)
The control unit 105 determines that the specimen container is the blood collection tube for rubber plug 204 with the height of 100 mm which is capped by the rubber plug 205, and ends the flow of the treatment.

(S805)
The control unit 105 determines whether the yellow color 706 is included in the detected reflected light. If the yellow color 706 is included, the treatment proceeds to S806, and otherwise, the treatment proceeds to S807.

(S806)
The control unit 105 determines that the specimen container is the blood collection tube for rubber plug 204 with the height of 100 mm which is uncapped, and ends the flow of the treatment.

(S807)
The control unit 105 determines whether the green color 707 is included in the detected reflected light. If the green color 707 is included, the treatment proceeds to S808, and otherwise, the treatment proceeds to S809.

(S808)
The control unit 105 determines that the specimen container is the blood collection tube for rubber plug 204 with the height of 90 mm which is capped by the rubber plug 205, and ends the flow of the treatment.

(S809)
The control unit 105 determines whether the blue color 708 is included in the detected reflected light. If the blue color 708 is included, the treatment proceeds to S810, and otherwise, the treatment proceeds to S811.

(S810)
The control unit 105 determines that the specimen container is the blood collection tube for rubber plug 204 with the height of 90 mm which is uncapped, and ends the flow of the treatment.

(S811)
The control unit 105 determines whether the indigo color 709 is included in the detected reflected light. If the indigo color 709 is included, the treatment proceeds to S812, and otherwise, the treatment proceeds to S813.

(S812)
The control unit 105 determines that the specimen container is the blood collection tube for rubber plug 204 with the height of 75 mm which is capped by the rubber plug 205, and ends the flow of the treatment.

(S813)
The control unit 105 determines whether the purple color 710 is included in the detected reflected light. If the purple color 710 is included, the treatment proceeds to S814, and otherwise, the treatment proceeds to S815.

(S814)
The control unit 105 determines that the specimen container is the blood collection tube for rubber plug 204 with the height of 75 mm which is uncapped, and ends the flow of the treatment.

(S815)
The control unit 105 determines that there is no blood collection tube that is the specimen container, and ends the flow of the treatment.

According to the flow of the treatment described above, it is possible to determine the height of the capped or uncapped specimen container by the rubber plug 205 based on the color of the reflected light detected with the rubber plug sensor 601.

As described above, according to the present embodiment, it is possible to detect whether the blood collection tube for rubber plug 204 which is one of the specimen containers is uncapped by the single rubber plug sensor 601. That is, it is possible to provide the specimen treatment system that can detect whether the specimen container is uncapped with a simple mechanism. According to the present embodiment, it is possible to determine the height of the blood collection tube for rubber plug 204.

In the above, two embodiments of the present invention are described. The present invention is not limited to the above embodiments, and components may be modified without departing from the gist of the present invention. A plurality of components described in the above embodiments may be appropriately combined. Some components may be deleted from all the components described in the above embodiments.

REFERENCE SIGNS LIST

100: pretreatment device
100a: charging unit
100b: storage unit
100c: centrifuge unit
100d: liquid amount measuring unit
100e: uncapping unit
100f: child blood collection tube generating unit
100g: dispensing unit
100h: capping unit
101: holder 102: conveyance passage
103: connecting unit
104: automatic analyzer
105: control unit
202: blood collection tube for seal plug
202a: 75-mm blood collection tube for seal plug
202b: 100-mm blood collection tube for seal plug
203: seal plug
204: blood collection tube for rubber plug
204a: 75-mm blood collection tube for rubber plug
204b: 100-mm blood collection tube for rubber plug
205: rubber plug
300: seal plug sensor
301: plug detection unit
302: belt
303: stopper
304: holder detection unit
305: holder rotating part
400: detection range
501: detection coil
502: high frequency magnetic field
503: detection circuit
504: shield
601: rubber plug sensor
602: dispersed light
701: light emitting and receiving part
702: white light
703: prism
704: red color
705: orange color
706: yellow color
707: green color
708: blue color
709: indigo color
710: purple color

The invention claimed is:

1. A specimen treatment system comprising:
an automatic analyzer that analyzes a specimen;
a pretreatment device that performs a pretreatment on the specimen; and
a conveyance passage that conveys a specimen container that houses the specimen between the automatic analyzer and the pretreatment device, in the automatic analyzer, or in the pretreatment device, wherein
the specimen treatment system further includes a single sensor that is disposed to be orthogonal to a longitudinal direction of the specimen container and that detects whether the specimen container is uncapped,
the sensor includes a detection coil that emits a high frequency magnetic field and a detection circuit that detects a state change of the high frequency magnetic field and detects whether the specimen container is capped with a seal plug based on the state change detected by the detection circuit,
the detection coil emits the high frequency magnetic field in a range of a different height of the specimen container,
the sensor further includes a shield that covers at least a portion of an outer peripheral surface of the detection coil, and
a range in which the high frequency magnetic field is emitted is adjusted by changing a relative position between the detection coil and the shield.

* * * * *